Figure 1:
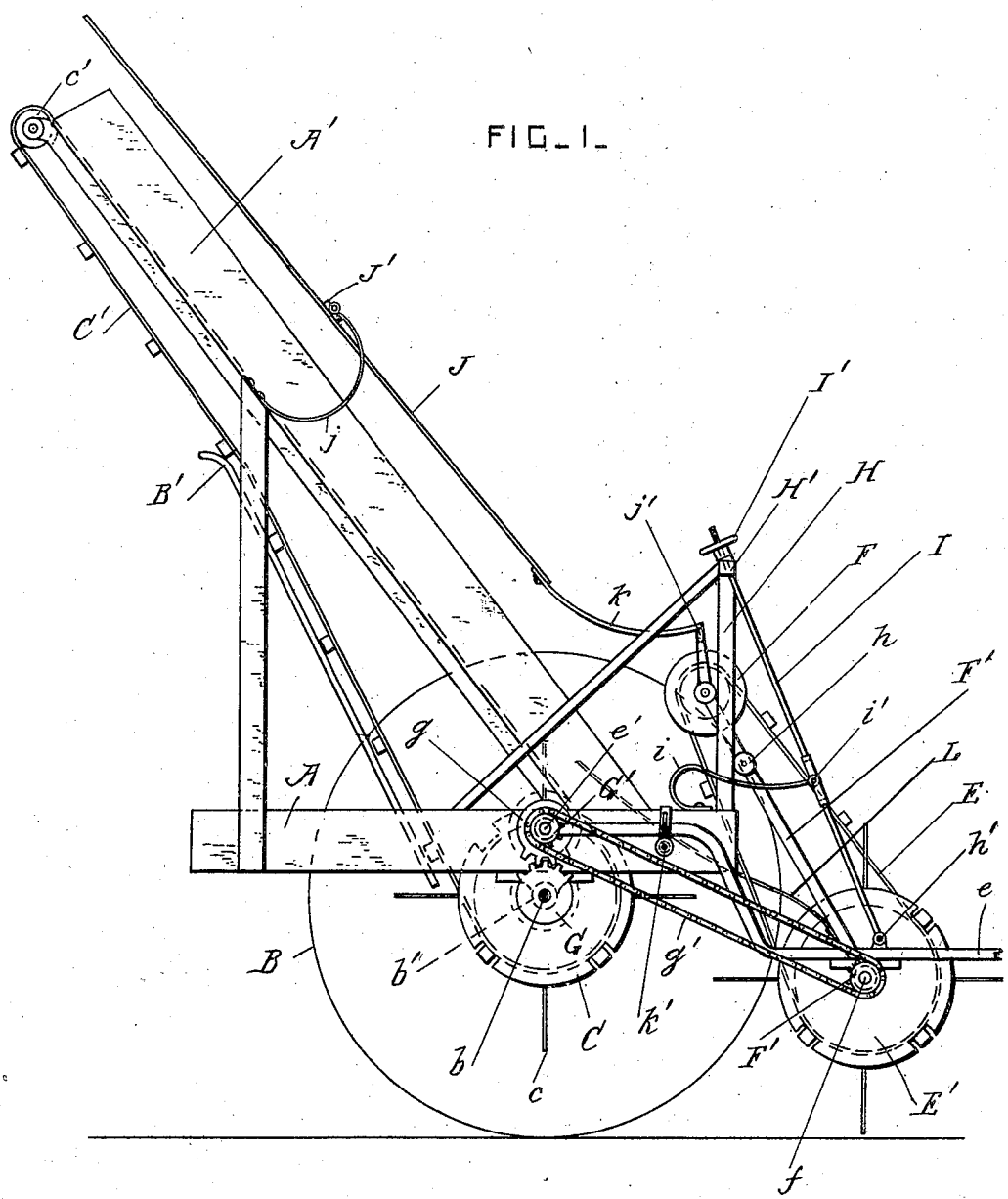

No. 844,196. PATENTED FEB. 12, 1907.
C. J. SHAW.
HAY LOADER.
APPLICATION FILED MAR. 12, 1906.

2 SHEETS—SHEET 1.

WITNESSES:

INVENTOR
Charles J. Shaw
By Herbert W. T. Jenner
Attorney

No. 844,196. PATENTED FEB. 12, 1907.
C. J. SHAW.
HAY LOADER.
APPLICATION FILED MAR. 12, 1906.
2 SHEETS—SHEET 2.
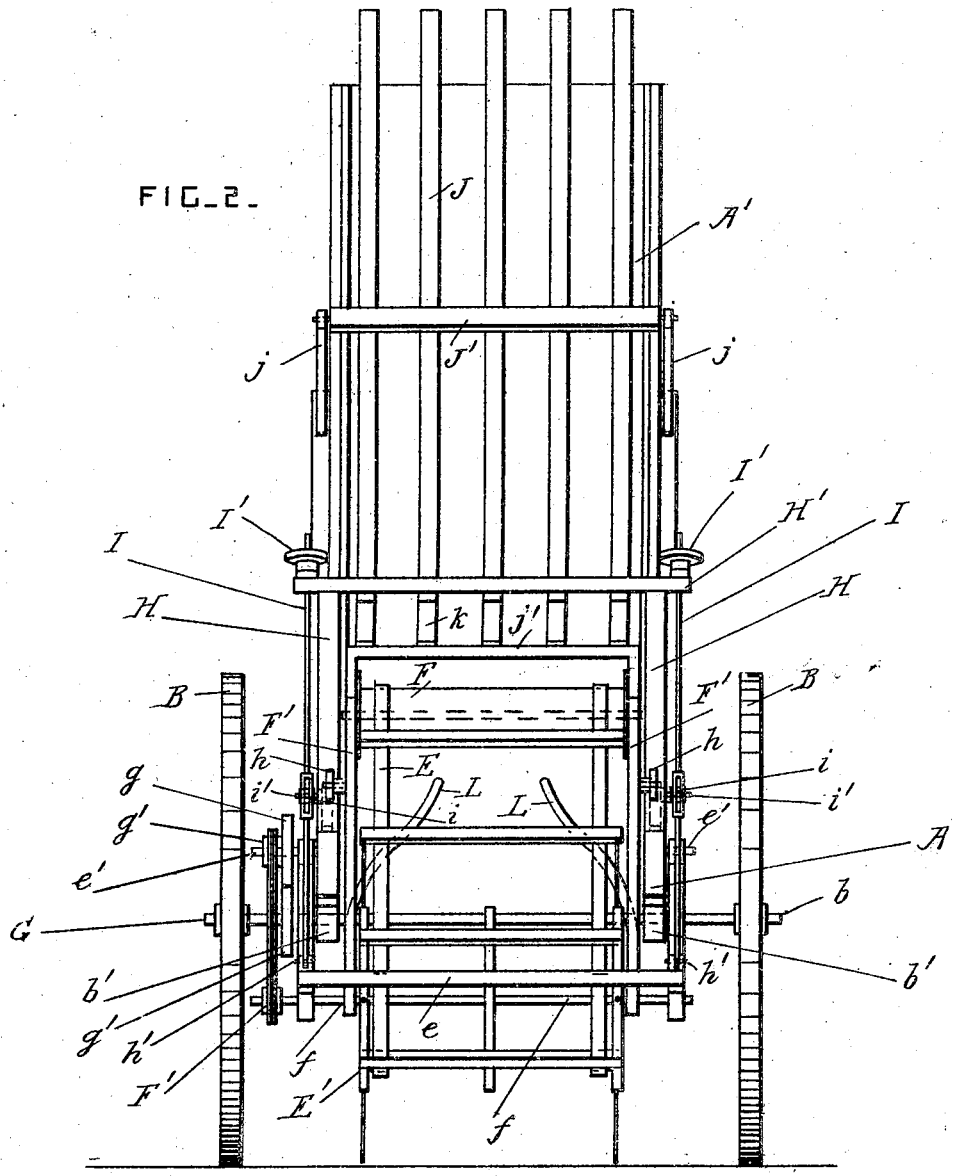
WITNESSES:
INVENTOR
Charles J. Shaw
By Herbert W. T. Jenner.
Attorney

UNITED STATES PATENT OFFICE.

CHARLES J. SHAW, OF OWOSSO, MICHIGAN.

HAY-LOADER.

No. 844,196.        Specification of Letters Patent.        Patented Feb. 12, 1907.

Application filed March 12, 1906. Serial No. 305,607.

*To all whom it may concern:*

Be it known that I, CHARLES J. SHAW, a citizen of the United States, residing at Owosso, in the county of Shiawassee and State of Michigan, have invented certain new and useful Improvements in Hay-Loaders; and I do hereby declare the following to be a full, clear, and exact description of the invention, such as will enable others skilled in the art to which it appertains to make and use the same.

This invention relates to machines for loading cut hay onto wagons; and it consists in the novel construction and combination of the parts hereinafter fully described and claimed.

In the drawings, Figure 1 is a side view of the machine. Fig. 2 is a rear view of the machine.

A is the main frame of the machine, which is mounted on ground-wheels B. These wheels are arranged upon the end portions of an axle $b$, which is journaled in bearings $b'$, secured to the frame.

C is the main cylinder, which is revolved by the axle $b$ and provided with teeth $c$.

C' is the main hay-elevator formed of endless bands or chains and cross-slats. This elevator is driven by the main cylinder, and its upper part passes over a roller $c'$ at the top of the elevator-trough A'.

B' is a guide for the descending part of the elevator which prevents it from sagging and dragging the hay out of the wagon.

The above-described parts are similar to those of hay-loaders heretofore used, and they are arranged and connected in any approved manner, and any approved means may be used for drawing the hay-loader along and for disconnecting its elevating mechanism from its ground-wheels when desired.

In carrying out this invention an auxiliary elevator E is arranged behind the main elevator. E' is a toothed cylinder which drives the auxiliary elevator and which is journaled in an auxiliary frame $e$, which is pivoted to the main frame A by pins $e'$. The auxiliary elevator is formed of endless flexible bands or chains and cross-slats similar to the main elevator, and F is a roller for supporting the upper part of the auxiliary elevator. The roller F is journaled in the upper end portions of side bars F', the lower end portions of which are pivoted on or concentric with the driving-shaft $f$ of the auxiliary cylinder E'. The auxiliary cylinder is driven from the axle $b$ by any approved driving mechanism, so that the adjacent portions of the two elevators are driven upwardly in the same direction and preferably at about the same speed.

G is a toothed wheel secured on the axle $b$ and gearing into a toothed wheel $g$, journaled on one of the pins $e'$.

F' is a drive-wheel secured on one end portion of the driving-shaft $f$ of the auxiliary cylinder, and G' is a drive-wheel secured to the toothed wheel $g$. An endless flexible driving-band $g'$ or drive-chain passes around the wheels F' and G', and this mechanism constitutes the preferred means for driving the auxiliary cylinder and elevator.

H are guide-bars secured to the rear part of the main frame and arranged substantially vertical. The side bars F' of the auxiliary elevator are provided with rollers or bearing-pieces $h$, which bear against the said guide-bars H.

H' is a cross-bar which extends between the upper ends of the guide-bars H.

I are supports for the auxiliary frame and cylinder. These supports preferably consist of rods the lower ends of which are pivoted to the auxiliary frame by pins $h'$. The upper ends of these rods are screw-threaded and are slidable in holes in the cross-bar H'. I' are hand-wheels screwed on the upper end portions of the supporting-rods I and affording a means for adjusting the position of the auxiliary cylinder and preventing it from dropping onto the ground. The rods I are free to slide upward in the holes in the cross-bar, and $i$ are springs secured to the main frame A and pivotally connected with the said supporting-rods by pins $i'$. These springs counterbalance the weight of the auxiliary elevator and cylinder to a great extent and permit them to rise easily.

J are the wind-break slats, which are arranged longitudinally over the upper part of the main elevator. A cross-bar J' is secured to the middle parts of these slats, and $j$ are springs which support the end portions of the cross-bar J' from the elevator-trough A'. The lower end portions of the wind-break slats are connected by curved arms $k$ to a cross-bar $j'$, which extends between the upper ends of the side bars F' of the auxiliary elevator.

The upper side portion of the main elevator works in the inclined trough A', which is supported by the main frame.

The auxiliary elevator is arranged in an upwardly and forwardly inclined position behind the lower end portion of the main elevator. A belt-tightener k' of any approved construction is secured to the auxiliary frame and bears against the drive chain or band of the auxiliary cylinder.

L are long leaf-springs the lower end portions of which are secured to the lower end portions of the side bars F'. These springs are suitably curved, and they operate to press the hay onto the main cylinder and the lower part of the main elevator and to prevent it from passing rearwardly over the top of the auxiliary elevator.

As the machine is drawn along the hay is raised between the two cylinders and elevators and is discharged at the top of the main elevator. The auxiliary cylinder and elevator feed the hay onto the main cylinder and elevator and prevent any of it from slipping backward onto the ground. As the auxiliary cylinder and elevator are free to move upwardly and rearwardly to a limited extent, they are enabled to handle bunches of hay to great advantage and the machine never becomes choked with the hay.

What I claim is—

1. The combination, with a hay-loader provided with a main elevator having a toothed hay-cylinder at its lower part, of an auxiliary frame pivoted to the frame of the said hay-loader, a driven shaft journaled in the said pivoted frame and provided with a driven wheel, a driving-wheel journaled concentric with the pivot of the said auxiliary frame, a driving device connecting the said wheels, upwardly-projecting guide-bars secured to the frame of the said hay-loader, side bars having their lower ends pivoted on the said shaft and provided with bearing-pieces at their upper parts which run on the said guide-bars, and an auxiliary endless elevator carried by the said shaft and the upper end portions of the said side bars, said auxiliary elevator being movable bodily in an upward direction and its upper part being arranged above the level of the said hay-cylinder and being movable rearwardly independent of its lower part.

2. The combination, with a hay-loader provided with a main elevator, of an auxiliary frame pivoted to the frame of the said hay-loader, a driven shaft journaled in the said pivoted frame and provided with a driven wheel, a driving-wheel journaled concentric with the pivot of the said auxiliary frame, a driving device connecting the said wheels, guides secured to the frame of the said hay-loader, inclined side bars having their lower end portions pivoted concentric with the said shaft and having bearing-pieces at their upper parts which run on the said guides, means for limiting the downward movement of the free end portion of the said auxiliary frame, springs connected to the frame of the said hay-loader and assisting the upward movement of the said auxiliary frame, and an auxiliary endless elevator carried by the said shaft and the upper portion of the said side bars, said auxiliary elevator being movable bodily in an upward direction and its upper part being movable rearwardly independent of its lower part.

3. The combination, with a hay-loader provided with a main elevator having a toothed hay-cylinder at its lower part, of an auxiliary frame pivoted to the frame of the said hay-loader, a driven shaft journaled in the said pivoted frame and provided with a driven wheel, a driving-wheel journaled concentric with the pivot of the said auxiliary frame, a driving device connecting the said wheels, upwardly-projecting guide-bars secured to the frame of the said hay-loader, side bars having their lower ends pivoted on the said shaft and provided with bearing-pieces at their upper parts which run on the said guide-bars, wind-break slats having their lower ends connected with the upper ends of the said side bars, springs connecting the upper parts of the said wind-break slats with the frame of the said main elevator, and an auxiliary endless elevator carried by the said shaft and the upper end portions of the said side bars, said auxiliary elevator being movable bodily in an upward direction and its upper part being arranged above the level of the said hay-cylinder and being movable rearwardly independent of its lower part.

4. The combination, with a hay-loader provided with a main endless elevator, of an auxiliary frame connected to the said hay-loader, an auxiliary endless elevator having side bars the lower ends of which are pivotally connected with the said auxiliary frame, and presser-springs having their lower end portions secured to the said side bars and having free upper end portions which project between the two said elevators.

In testimony whereof I have affixed my signature in the presence of two witnesses.

CHARLES J. SHAW.

Witnesses:
W. LEE CROWE,
F. E. HARTSHORN.